June 12, 1945.                W. L. BOND                    2,377,862
                        X-RAY ANALYSIS APPARATUS
                         Filed May 11, 1943           5 Sheets-Sheet 1

INVENTOR
W. L. BOND
BY
ATTORNEY.

June 12, 1945.    W. L. BOND    2,377,862
X-RAY ANALYSIS APPARATUS
Filed May 11, 1943    5 Sheets-Sheet 3

INVENTOR
W. L. BOND
BY
E. V. Griggs
ATTORNEY

June 12, 1945. W. L. BOND 2,377,862
X-RAY ANALYSIS APPARATUS
Filed May 11, 1943 5 Sheets-Sheet 4

INVENTOR
W. L. BOND
BY
ATTORNEY

June 12, 1945.  W. L. BOND  2,377,862
X-RAY ANALYSIS APPARATUS
Filed May 11, 1943  5 Sheets-Sheet 5

INVENTOR
W. L. BOND
BY
E. V. Griggs
ATTORNEY

Patented June 12, 1945

2,377,862

UNITED STATES PATENT OFFICE 2,377,862

X-RAY ANALYSIS APPARATUS

Walter L. Bond, Brooklyn, N. Y., assignor to Bell Telephone Laboratories, Incorporated, New York, N. Y., a corporation of New York Application May 11, 1943, Serial No. 486,495

9 Claims. (Cl. 250—83.6)

This invention relates to X-ray analysis apparatus and more particularly to an X-ray goniometer for use in the examination of quartz piezoelectric crystals.

An object of the invention is to improve and facilitate the production of quartz piezoelectric crystals.

Another object of the invention is to provide a compact, cohesive and unitary assembly of the various units of an X-ray analysis apparatus.

A more specific object of the invention is to facilitate ascertaining whether an adjustment achieved during X-ray analysis of a quartz piezoelectric crystal is "perfect" or sufficiently close to perfect to be comprehended by the "tolerance" value.

In connection with the preparation of quartz piezoelectric plates it is the practice of some manufacturers to examine the mother crystal and the plates cut therefrom by means of X-rays at various stages in the manufacture. For example, there is disclosed in Patent 2,151,736, issued March 28, 1939 to W. W. Broughton a testing procedure in accordance with which quartz crystals are examined by means of X-rays.

A procedure similar in general to that described by the Broughton patent referred to and one which may be followed to advantage in the production of quartz piezoelectric plates involves temporarily attaching the crystal to the adjustable end of a crystal holding fixture of the cylinder type which may be of the general type described in Patent No. 2,357,307, issued to me September 5, 1944 entitled "Work supporting fixture." The cylinder type holding fixture is then so mounted in the X-ray goniometer that the crystal is at that angle with respect to the projected X-ray beam at which reflection should occur. (For a particular wave-length of X-rays, the angle of reflection is usually determined by the atomic plane of the crystal plate which is used to reflect the X-rays.) If reflection does not occur, small adjustments in the position of the crystal are made by means of the cylinder fixture mechanism until reflection is found. The crystal is then locked in this last position and ground true to the cylinder.

The arrangement of the present invention is applicable particularly in connection with the X-ray analysis of quartz piezoelectric crystals.

A feature of the present invention resides in a unitary and compact assembly on a common base of the various elements of an X-ray analysis apparatus.

A further feature of the present invention is a "tolerance lever" by a simple operation of which a relatively small, accurately defined, movement of the crystal under test in each of two directions from the selected adjusted position may be achieved whereby it may be readily ascertained whether the selected position is the "best" position or removed from the best position by an amount not exceeding the tolerance value.

Another features resides in means whereby a plurality of movements of relatively short, predetermined, distances of the crystal supporting means may be readily achieved, these movements being entirely independent of the tolerance and other adjustments provided.

A still further feature of the present invention is means whereby the apparatus may be quickly and easily adjusted for use with different "cuts" of crystals.

In accordance with a specific embodiment of the invention the various elements of the X-ray analysis apparatus, i. e., the slit, the cylinder supporting carriage (the arrangement is particularly intended for use in conjunction with cylinder type crystal holding fixtures of the general type described in my patent referred to above) and the ionization chamber are all supported by a common base. Means are provided whereby the cylinder supporting carriage may be easily "lined up" with respect to the incident X-ray beam for different standard cuts of crystals, this step involving merely aligning apertures in two adjacent plates and inserting a holding pin in the aligned apertures. Further, relatively small adjustments in the position of the crystal are made, for example, by the adjusting means described in my patent referred to above if that type of supporting fixture is being used, until the operator believes he has obtained the position of maximum reflection. A "tolerance" lever is provided by a simple movement of which the cylinder supporting carriage is swung a relatively short, accurately defined, distance in each of two directions from the final adjustment selected by the operator as the position of maximum reflection. The extent of movement caused by operation of the tolerance lever is established in accordance with the tolerance, i. e., the slight departure from perfect which is allowable in the particular project. If a decrease in reflection is noticed at some point in the movement controlled by the tolerance lever, this will indicate that the adjusted position is at least within the tolerance range. Additional means, in the form of a slotted bar, permit an additional adjustment of the carriage which is independent of the lining up and tolerance adjustments referred to; this latter adjustment is also for fixed, accurately defined, distances and is particularly useful in instances where the crystals being examined are apt to vary frequently as to type of cut.

A complete understanding of the design and operation of the arrangement contemplated by the present invention and appreciation of the various features thereof will be gained from consideration of the following detailed description and the annexed drawings in which.

Figure 1:
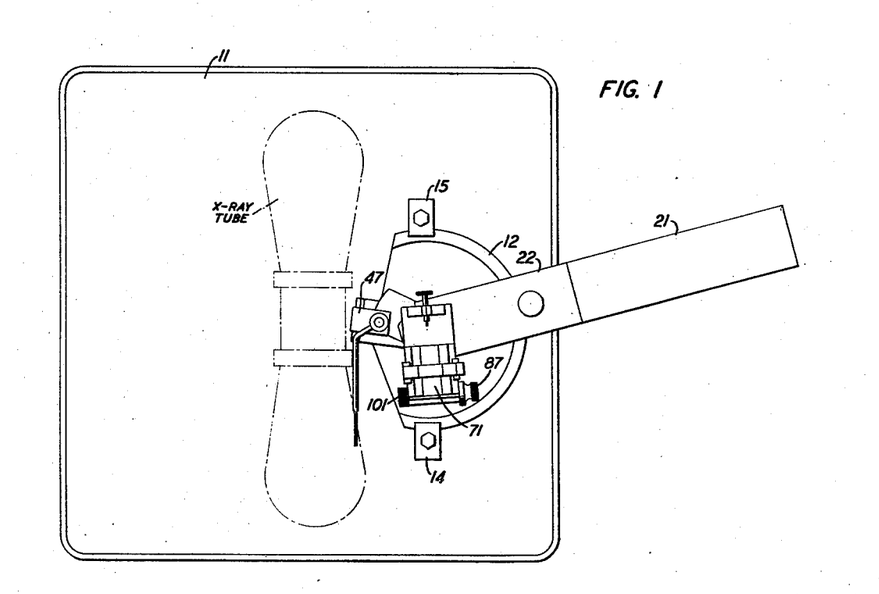
Fig. 1 is a plan view of X-ray analysis apparatus embodying features of the present invention, the position of the X-ray tube being indicated by dotted lines.
Figure 2:
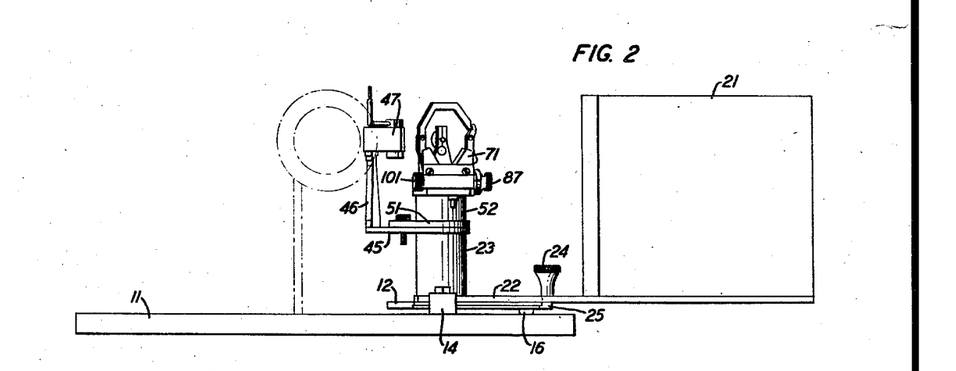
Fig. 2 is a side elevation of the apparatus shown in Fig. 1.

Referring now to the drawings, the X-ray analysis apparatus is shown in Figs. 1 and 2 mounted on a square base plate 11, the approximate position of the X-ray tube in relation to the goniometer being indicated by dotted lines. Suitable mounting means, such as the vertical arm shown in dotted outline is provided for supporting the X-ray tube from base plate 11. Base plate 11 is sufficiently large to permit mounting a second goniometer on the opposite side of the X-ray tube or other apparatus may be mounted on the plate as desired. Base plate 12, which is the common base for the various elements of the goniometer and which is in the form of a portion of a disc, is fastened to base plate 11 by clamps 14 and 15, a plurality of spaced blocks (block 16 shown in Fig. 2) serving as spacing elements between plates 11 and 12. By releasing the pressure of clamps 14 and 15, which are held by machine bolts, on the periphery of base plate 12, plate 12 and the entire X-ray goniometer assembly supported thereby may be rotated as desired; for example, this may be done in order to attain a new alignment of the apparatus after replacement of the X-ray tube.

Figure 4:
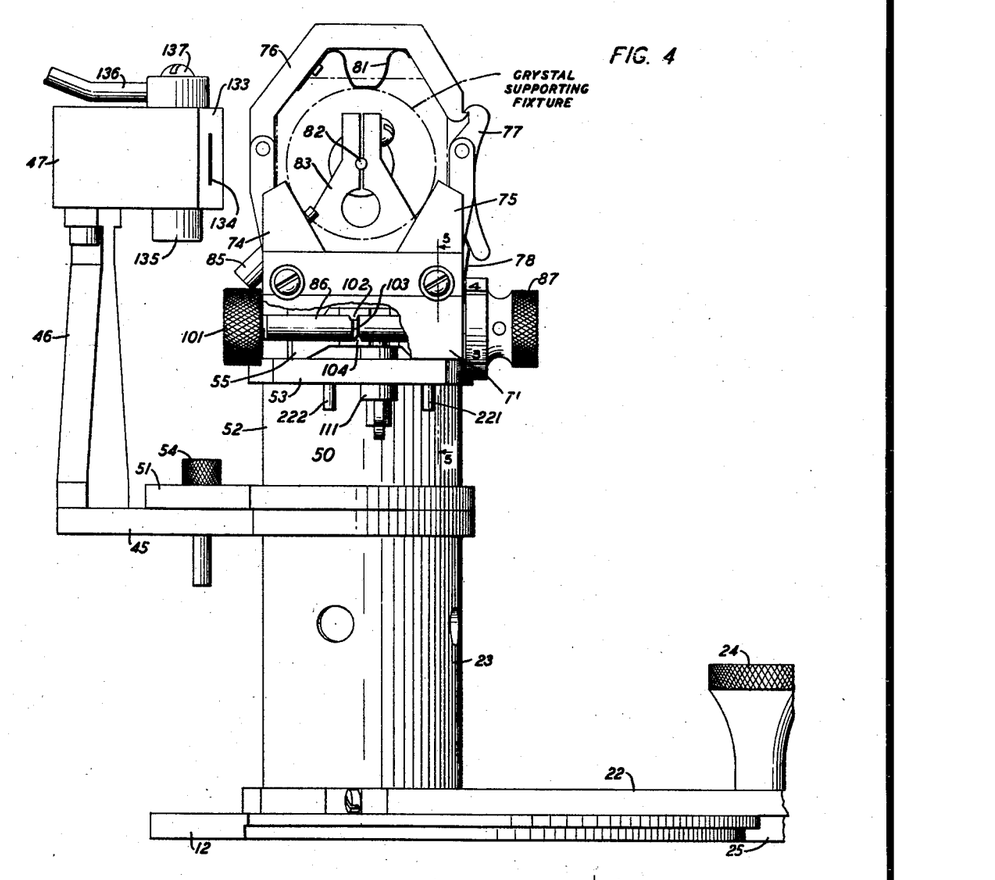
Fig. 4 is an enlarged side elevational view of the apparatus shown in Fig. 3.
Figures 7, 10:
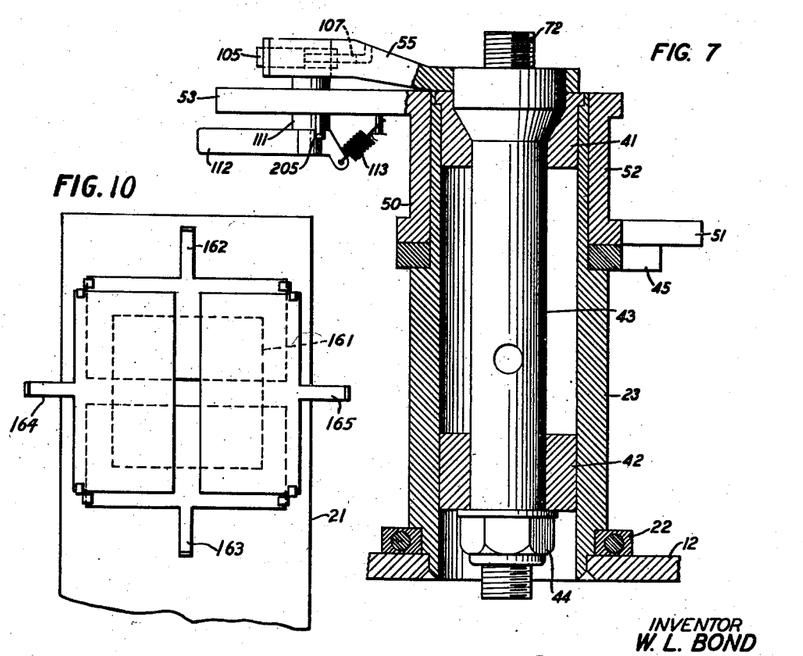
Fig. 7 is a side elevation in partial section of the vertical pillar arrangement for supporting and rotating the cylinder supporting carriage, the X-ray slit assembly and supporting means therefor being removed.
Fig. 10 is an enlarged view of a portion of the front face of the ionization chamber showing the arrangement of the aperture adjusting shutters.

Ionization chamber 21 is supported by arm 22 which, in turn, as shown in Figs. 4 and 7, is rotatably clamped in a peripheral groove provided in vertical cylinder 23 adjacent to the upper surface of base plate 12. (Vertical cylinder 23 is attached to base plate 12 by suitable means, for example, by welding.) Arm 22 and ionization chamber 21 supported thereby are, therefore, rotatable on base plate 12, the arm being locked in position when desired by tightening knurled thumb screw 24 which, in turn, draws clamp 25 up against the lower surface of base plate 12.

As shown clearly in Fig. 7, bushings 41 and 42 are positioned in cylindrical member 23; shaft 43 is positioned in these two bushings being held in place by nut 44.

Plate 45 is mounted on cylinder 23 being normally held from rotation with respect thereto by suitable means such as pins positioned in registering apertures in the plate and the cylinder. As shown, particularly in Figs. 2 and 4, vertical supporting arm 46 is mounted on plate 45 being held in position, for example, by pins registering in the apertures provided at the free end of plate 45 (shown in Fig. 8) and correspondingly located apertures in the bottom of arm 46. Arm 46 supports X-ray slit assembly 47 which will be described in detail subsequently.

Rotatably mounted on cylinder 23 above plate 45 is member 50 comprising three main portions joined as an integral unit, these portions being horizontal plate 51, vertical cylinder 52 and horizontal plate 53. This member, on occasion, may be locked in rotational position with respect to plate 45 by positioning tapered pin 54 in registering apertures in plates 51 and 45.

Plate 55 is rotatably mounted on shaft 43, the collar end of the plate being in engagement with the upper surfaces of cylinder 23 and bushing 41 and the free end being bent upward to provide clearance between said free end and plate 53.

Cylinder fixture supporting carriage 71 (see particularly Figs. 9 and 4) is adapted to be mounted above plate 55, threaded portion 72 of shaft 43 being adapted to engage tapped aperture 73 of the carriage. As pointed out earlier in the description, carriage 71 is adapted to support a crystal holding fixture of the cylinder or barrel type; a fixture of this general type is described, as previously stated, in Patent No. 2,357,307 issued to me September 5, 1944, entitled "Work supporting fixture." The general arrangement of such a fixture is indicated by dotted outline in Figs. 3 and 4, a crystal plate being shown (also by dotted outline) mounted on the fixture in Fig. 3.

The supporting carriage assembly includes two side members 74 and 75, which cooperate to form a trough in which the cylinder crystal holding fixture may be positioned; after the fixture is in position in the trough, hinged clamping arm 76 is closed (the position illustrated) and locked in closed position by catch 77. Flat spring 78 acts to normally hold catch 77 in the engagement position illustrated. When arm 76 is in closed position, spring 81 (Fig. 4) is forced into engagement with the surface of the crystal holding fixture and exerts sufficient pressure thereon to normally hold the fixture in position in the trough.

Figure 3:
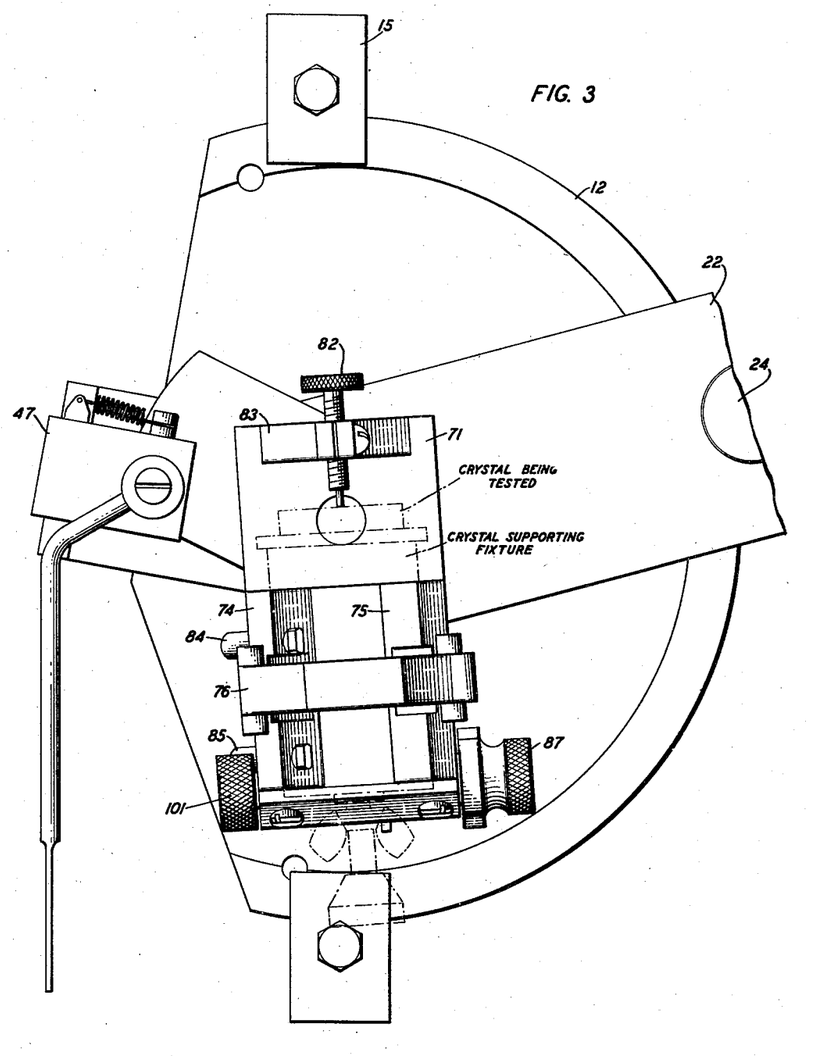
Fig. 3 is an enlarged plan view of the goniometer assembly, the ionization chamber not being shown and the ionization chamber arm being partially broken away.

Screw 82 is carried by vertical plate 83; when the apparatus is in use screw 82 is normally adjusted to bring the projecting tip thereof into engagement with a surface of the crystal mounted on the cylinder crystal holding fixture (Fig. 3).

Two pins, 84 and 85, are positioned in side member 74 with their tips projecting slightly into the trough; the cylinder crystal supporting fixture may be provided with a lateral positioning slot and the tips of the pins may be positioned therein when the fixture is in place in the trough.

Figure 11:
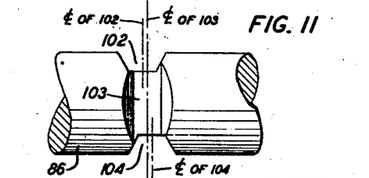
Fig. 11 is an enlarged view of a portion of the slotted adjusting bar showing the relative positions of the slots therein.

Slotted bar 86 (Fig. 4) is mounted at one end of carriage 71, notched knob 87 being mounted on one end of the bar and nut 101 on the other end. Bar 86 is provided about midway between the two ends thereof with four peripheral slots 102, 103, 104 and a fourth slot not illustrated. While these four slots join to form a continuous peripheral path around bar 86, they are not aligned but are offset or staggered slightly with respect to each other; the relative positions of slots 102, 103 and 104 will be apparent from Fig. 11, while the fourth slot, which is not shown, is aligned with slot 103.

As shown, particularly in Figs. 5, 6, 7, and 8, a chamber is drilled in plate 55 in which is positioned pin 105 which is biased in a direction away from the rear wall of the chamber by coiled spring 106. The rear of the chamber is provided with air vent 107 which communicates with the exterior atmosphere.

Figure 5:
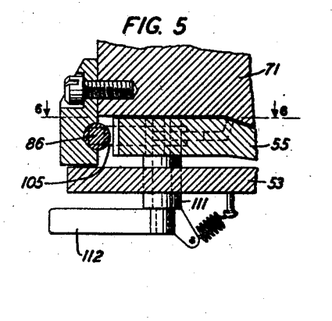
Fig. 5 is a sectional view taken on lines 5—5 of Fig. 4.
Figure 6:
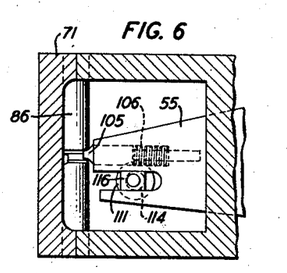
Fig. 6 is a view taken on line 6—6 of Fig. 5.

When carriage 71 is in place, the projecting tip of pin 105 is, as shown particularly in Figs. 5 and 6, engaged in one of the four slots in bar 86. The particular slot engaged at any particular time is determined by the rotational position of knob 87 and bar 86 controlled thereby. Knob 87 is provided with four notches corresponding to the four slots in bar 86; these notches may be marked "1," "2," "3," "4" to facilitate determining the rotational position of the bar at any particular time. Spring arm 108 aids in adjustment of bar 86 and in "centering" it in any of the four adjusted positions. The purpose and operation of this portion of the invention will be described in detail subsequently.

A portion of plate 55 adjacent to the location of the chamber referred to above is cut away leaving this particular portion of the plate in the shape of a "U."

Vertical pin 111 is rotatably mounted in plate 53. The pin may be rotated a predetermined distance (for a purpose which will be explained later) in either direction by lever 112, being normally held in neutral position by spring 113. As shown in Fig. 6, pin 111 terminates at its upper portion in an off-center portion upon which is mounted cam block 116; this cam block is positioned in the U-shaped cut-away portion of the plate 55. The purpose and operation of this portion of the invention will be described in detail subsequently.

As previously pointed out X-ray slit assembly 47 is supported by vertical arm 46. The purpose of slit assembly 47 is to control the flow of the X-rays, i. e. to cut off the flow except when tests are actually under way.

Figure 12:
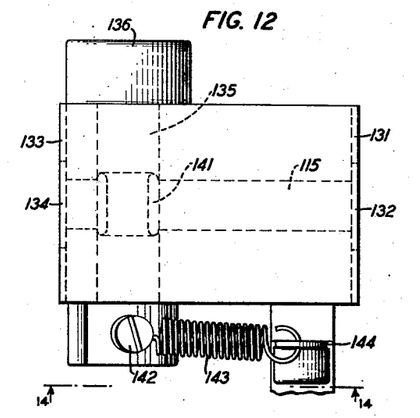
Fig. 12 is an enlarged side view of the X-ray slit assembly.

The slit assembly comprises a rectangular metallic block having a centrally located horizontal bore 115 (Fig. 12) therein as well as a vertical bore which crosses and communicates with the horizontal bore. A metal plate is attached to each end of the block, each of which plates has a narrow slot therein which registers with the respective end of horizontal bore 115. Thus end plate 131 is provided with slot 132 and end plate 133 is provided with slot 134.

Figure 13:
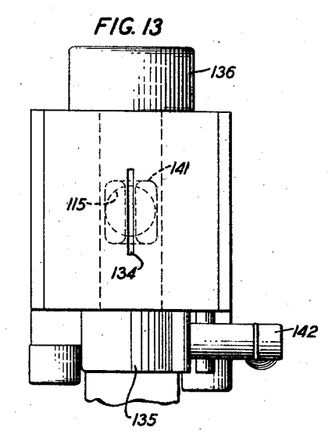
Fig. 13 is an end view of the slit assembly of Fig. 12.
Figure 14:
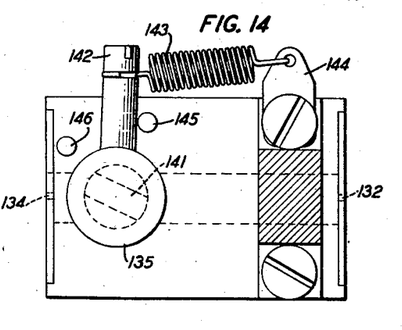
Fig. 14 is a view taken on lines 14—14 of Fig. 12.

A pin 135 is positioned in the vertical bore of the slit assembly, operating handle 136 being attached to the upper end of the pin by screw 137 (Fig. 4). Pin 135 has a slot 141 passing therethrough at the point where the pin passes through horizontal bore 115. A smaller pin 142 is anchored in the base of pin 135; coiled spring 143, one end of which is attached to pin 142 and the other end of which is attached to plate 144 acts to normally hold pin 142 in contact with dowel 145. This is the condition illustrated in Figs. 12, 13 and 14 and it will be observed that in this position slot 141 is misaligned in horizontal bore 115 with respect to slits 132 and 134 so that passage of X-rays is prevented. However, pin 135 may be rotated by operating lever 136 against the biasing action of spring 143 to a position wherein pin 142 engages dowel 146. In this position slot 141 is aligned with the slits in horizontal bore 115 and X-rays entering slit 132 may traverse bore 115 and pass out through slit 134.

Ionization chamber 21 is provided in the front with an aperture 161 (Fig. 10) for entry of the reflected X-rays. In order that the effective area of the aperture may be accurately adjusted four cooperating shutters are provided, shutters 162 and 163 being adapted to move vertically and shutters 164 and 165 being adapted to move horizontally. Suitable means, such as the corner guides illustrated, may be used to support and guide the shutters. Provision of the two sets of shutters allows for the adjustment of the aperture with respect to horizontal width, with respect to vertical width or, when both sets are used simultaneously, both with respect to vertical and horizontal width at the same time.

Figure 15:
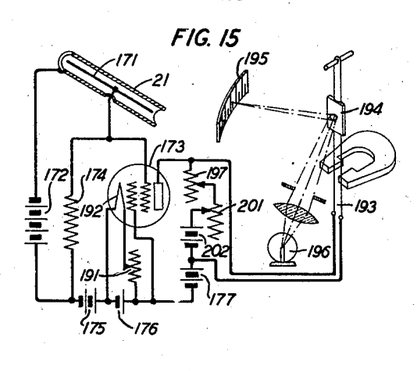
Fig. 15 is a schematic showing of a circuit that may be associated with the ionization chamber.

Referring now to Fig. 15 there is schematically illustrated a circuit that may be used in conjunction with ionization chamber 21 in order to indicate reflection of X-rays by a crystal being tested in the goniometer of the present invention. Collector plate 171 of the ionization chamber is connected in series with battery 172 and the input resistance of vacuum tube 173; tube 173 may be of a type commonly referred to as the "General Electric Co. Pliotron FP.54." A relatively high resistance 174 is included in the input circuit of the vacuum tube while the usual voltage sources 175, 176 and 177 are connected in the conventional manner; rheostat 191 being provided for controlling the energization of cathode 192. The vibrating ribbon 193 of a galvanometer (shown schematically) is connected across the output of vacuum tube 173. Mirror 194, vibrated by ribbon 193, is adapted to reflect a beam of light onto scale 195, the light being projected onto mirror 194 from light source 196. By means of rheostat 197 and 201, which are connected in series with battery 202 across the output circuit of the vacuum tube, the galvanometer circuit may be so regulated that normally no current will pass through ribbon 193 and the beam of light reflected by mirror 194 will be stationary on scale 195. When an X-ray beam enters ionization chamber 21 and strikes collector plate 171, a current is produced along plate 171 and a potential is established across the input circuit of vacuum tube 173. As a result the plate resistance of the vacuum tube is changed and the output circuit is unbalanced causing a current to flow through galvanometer ribbon 193 which results in rotation of mirror 194; this, in turn, causes movement of the light beam along scale 195, thus providing indication of the intensity of the X-ray beam reflected by the crystal being tested.

The arrangement contemplated by the invention will now be further described by assuming that a crystal is being tested for X-ray reflection. As indicated in Fig. 3 by dotted lines, the crystal to be tested is temporarily mounted on a cylinder type crystal holding fixture of the nature disclosed in my patent referred to above. The supporting fixture, in turn, is positioned in the trough of carriage 71 and arm 76 is latched in closed position wherein spring 81 presses against the upper surface of the fixture (Fig. 4) with sufficient force to hold it in position under normal conditions. Screw 82 is then adjusted to bring the tip thereof into engagement with the surface of the crystal.

Figure 8:
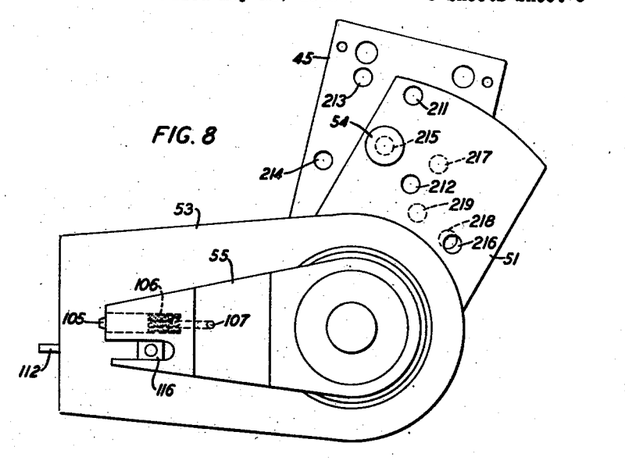
Fig. 8 is a plan view of the apparatus of Fig. 7.

The approximately correct angular position of the crystal being tested with respect to the incident beam of X-rays is first obtained by rotation of member 50 (pin 54 being removed) and the upper part of the assembly, including carriage 71, that is supported thereby. This first adjustment is determined by the type or "cut" of the crystal and as shown in Fig. 8 a plurality of apertures are provided at spaced intervals in plates 51 and 45. These apertures are spaced on plates 45 and 51 according to a precise layout which is planned according to the types of cuts of crystals to be tested. It will be observed that in the present instance, two of the apertures in plate 51, namely, apertures 211 and 212, are so located that each will register with only one aperture in plate 45 (aperture 213 and aperture 214, respectively) as plate 51 is rotated while aperture 215 will register either with aperture 217 or the aperture with which it is in registry in the position of Fig. 8 and aperture 216 will register with either aperture 218 or 219. This arrangement permits flexibility in the adjustment of plate 51 with respect to plate 45 and yet permits accurate and definite positioning according to predetermined characteristics. It will be assumed that the adjustment shown in Fig. 8 wherein pin 54 is positioned in aperture 215 and the aperture of plate 45 in registry therewith corresponds to the CT cut and that it is this cut which is to be tested. Member 50 is rotated, therefore, until plate 51 is in the position of Fig. 8 whereupon pin 54 is positioned in aperture 215 and the aperture in registry therewith, thereby locking plates 45 and 51 together. It will be clear that cylinder supporting carriage 71 will be rotated at this time with member 50 as it will be remembered that the carriage is keyed to plate 55 through engagement of the projecting tip of pin 105 in one of the slots in bar 86 and that plate 55, in turn, is keyed to plate 53 through engagement of the cam portion of pin 111 in the U-shaped cut-away portion of plate 55. The CT plate will now be in that position with respect to the incident X-ray beam at which reflection of the X-ray beam will occur if the crystal has been properly and accurately cut.

Clamp 25 is now released by rotation of thumb screw 24 and arm 22 is rotated about the common base to bring ionization chamber 21 to the proper angle to receive X-rays if reflected by the crystal. The arm is locked in the desired position by tightening clamp 25 and the X-ray tube is then energized.

Aperture 161 (Fig. 10) in the face of the ionization chamber is now adjusted as desired by manipulation of one or both pairs of shutters.

Lever 136 is now moved to align slot 141 in horizontal bore 115 (Fig. 12) of slit assembly 47 in order that the X-rays may be projected through slits 132 and 134 to the crystal.

The tester now observes by the means provided (for example if the circuit of Fig. 15 be provided he will observe scale 195) whether the incident X-ray beam is reflected and if so whether the reflection is "maximum." In most cases in order to achieve reflection, or at least the "maximum" reflection, it will be necessary for the tester at this point to make small adjustments in the position of the crystal with respect to the incident X-ray beam. The cylinder type supporting fixture of my patent referred to above includes convenient means, in the form of a draw bolt, for making these small adjustments; such means is shown as a part of the fixture by dotted outline in Fig. 3.

The tester has now, therefore, adjusted the crystal to the position which, in his opinion, results in maximum reflection. Now in the mass production of crystals, as in most other items produced on a quantity basis, it is usual to establish a "tolerance" value for the various groups of crystals to be produced. Establishment of a tolerance in the present instance means, of course, that the position selected by the tester as that of "maximum reflection" need only be within the tolerance range of the point that would actually produce maximum reflection. These tolerances in the case of crystal production cannot as a rule be large; we will assume that a tolerance of fifteen minutes has been established in the present case; that is, that an adjustment of the crystal to a position that is within fifteen minutes in either direction of rotation from the point of "perfect" adjustment. The tolerance lever which is a novel feature of the arrangement of the present invention, provides for readily, quickly and accurately determining whether the position selected by the tester is within the tolerance value.

As pointed out above and as shown particularly in Figs. 5, 6, 7 and 8, pin 111 terminates at its upper end in an offset portion upon which is mounted cam block 116 which, in turn, is positioned in the U-shaped cut-away portion of plate 55. The pin assembly is designed in accordance with the tolerance value established whereby rotation of pin 114 in either direction will cause plate 55 to move a distance equal to the tolerance value.

In order to test his establishment of the adjustment for maximum reflection, therefore, the operator moves lever 112 first in one direction and then in the opposite direction, observing in each instance by the means for indicating reflection (for example, scale 195, if the circuit of Fig. 15 is being used) whether a decrease in reflection occurs at some point during each movement of the lever. The movement of lever 112 in each direction is limited by respective dowel pins 221 and 222 (Fig. 4).

Movement of lever 112 causes, of course, rotation of pin 111 and, as cam block 116 carried by the offset portion thereof is positioned snugly in the U-shaped cut-away portion of plate 55 (Fig. 6), rotation of the pin will cause plate 55 to move a corresponding lateral distance in a direction dependent upon the direction of rotation of the pin. Now as plate 55 is locked to carriage 71 due to engagement of the projecting tip of pin 105 in a slot of bar 86, carriage 71 moves with plate 55.

It will be obvious, therefore, that merely by flipping lever 112 in each of two directions, a movement in corresponding directions of the cylinder supporting carriage (and crystal holding fixture and crystal supported thereby) is attained which is of definite and accurately defined extent. No particular skill or care is required for the operation and chances for misinterpretation of the result appear nil.

It will be clear that if the position selected by the tester as the point of maximum reflection was actually the "best" point or if it was within the tolerance range of the best point, a decrease in reflection will occur at some point in the movement of the crystal in each direction by the tolerance lever. For example, if we assume first that we start exactly from the best point, it will be obvious that reflection will drop during the entire swing of the crystal in both directions away from the point. If the point selected as the best point were to the left of the actual point of maximum reflection a distance less than the tolerance value, a decrease in reflection would, of course, occur during the entire swing of the crystal to the left, while with respect to the swing to the right, reflection would increase until the real point of maximum reflection was reached and passed after which the reflection would decrease, i. e., decrease in reflection would occur at some point in the swing in each direction indicating that the selected position was within the tolerance range and acceptable. However, in the example just cited, if the selected position had been to the left of the real point of maximum reflection a distance greater than the tolerance value, an increase in reflection would occur during the entire swing to the right (as the real point would be approached but not passed) thereby indicating that the selected position was not within the tolerance range and, therefore, unacceptable. Selected points to the right of the real maximum reflection point are, of course, tested in the same manner.

It will be evident that the tolerance lever arrangement of the present invention provides for quickly and accurately swinging the crystal under test a predetermined distance in two opposite directions for testing purposes and returns the crystal to its normal position thereafter. The over-all adjustment of the assembly is not disturbed in any way nor is the adjustment of the crystal supporting fixture interfered with.

If the position selected by the tester be found acceptable the crystal holding fixture, with the crystal locked in adjusted position, may be removed from carriage 71 and advanced to another step in the finishing thereof.

It will be understood that the cam portion of pin 111 will be designed in each case to give a "swing" of plate 55 that is equal to the tolerance value of the particular moment.

It may often transpire during a "run" of crystals through the analysis apparatus that it may become desirable to temporarily change the angular position of the carriage (and the crystal) without changing the over-all adjustment of plates 51 and 45 which, as stated above, is preset in accordance with the type of crystals being examined. The arrangement of the present invention provides means for easily and rapidly moving carriage 71 a predetermined distance in either of two directions without disturbing the other adjustments of the assembly or interfering with the function of the tolerance lever.

As described above, bar 86 is provided with four peripheral slots which are offset or staggered with respect to each other. The projecting tip of pin 105 is positioned in one of these four slots, the particular slot engaged by the pin depending upon the rotational position of notched knob 87.

Let us assume that, as shown in Figs. 4 and 5, the tip of pin 105 is in engagement with the slot that is directly opposite to slot 103; this slot as previously pointed out is aligned with slot 103 and it and slot 103 are the two "normal position" slots.

Figure 9:
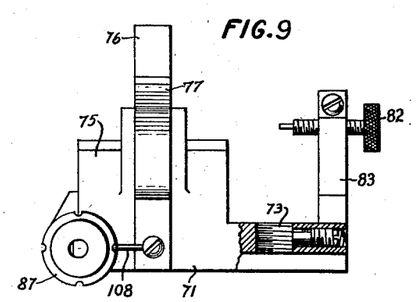
Fig. 9 is a side elevation of the cylinder fixture supporting carriage.

Now let us assume that knob 87 be rotated in a clockwise direction one position, i. e., sufficient to bring the next notch of knob 87 into position to be engaged by spring 108 (Fig. 9). Rotation of plate 55 (which carries pin 105) with respect to member 50 (which includes plates 51 and 53) is prevented at this time by the engagement of cam block 116 of pin 111 with the defining walls of the U-shaped cut-out portion of plate 55 (Fig. 6). As knob 87 is rotated to bring slot 102 into engagement with the tip of pin 105, the pin itself and carriage 71 will be rotated in a counter-clockwise direction, about shaft 43 (Fig. 7) as an axis, a distance determined by the amount that slot 102 is offset with respect to the slot previously engaged by pin 105. This, of course, changes the position of the crystal holding fixture and the crystal supported thereby but does not affect the previous adjustment of plate 51 with respect to plate 45 nor is the operation of the tolerance lever arrangement interfered with.

Rotation of knob 87 one more step will bring carriage 71 back to its original normal position (slot 103 being aligned with the slot directly opposite and both being centrally located with respect to slots 102 and 104) while still further rotation of an additional step will result in clockwise rotation of carriage 71 through engagement of the tip of pin 105 in slot 104.

The slotted bar arrangement of the present invention provides means whereby accurately measured movement of the cylinder supporting carriage in either of two opposite directions may be simply and easily achieved merely by rotation of the notched knob.

The combination of adjustments provided by the novel arrangement contemplated by the present invention renders the arrangement of particular value in connection with the mass production of crystals. The arrangement is such that none of the adjustments interferes with the others. The tolerance adjustment is operative in exactly the same way regardless of which "cut" the machine has been set for and, further, is also operative in the same way regardless of whether or not the position of the carriage may have been changed from normal by operation of the slotted bar and, if so, whether the carriage has been rotated clockwise or counter-clockwise. All of the adjusting means, furthermore, lend themselves to the achievement of the highly accurate results necessary in crystal production without requiring more than average skill or excessive concentration or preciseness in the operation thereof. Both the tolerance lever and the slotted bar arrangement may be readily operated entirely by "touch" so that the tester may keep his eye on the scale or other reflection indicator while making the adjustments.

While certain specific embodiments of the invention have been selected for illustration and description, the invention is not, of course, limited in its application to the embodiments so disclosed. The embodiments disclosed should be taken as illustrative of the invention and not as restrictive thereof.

What is claimed is:

1. In apparatus for analysis of a crystal by X-rays, a source of X-rays, means for supporting a crystal being examined in the path of X-rays from said source, means for adjusting the position of said supporting means with respect to the path of X-rays, and lever controlled means for moving said supporting means a predetermined distance in each of two opposite directions from the adjusted position thereof.

2. In apparatus for analysis of a crystal by X-rays, a source of X-rays, means for supporting a crystal being examined in the path of X-rays from said source, means for adjusting the position of said supporting means with respect to the path of X-rays, means independent of said last-mentioned adjusting means for changing the position of said supporting means a predetermined amount in either of two opposite directions from the position established by said first-mentioned adjusting means, and means for producing further movement of said supporting means of a predetermined magnitude in each of two opposite directions from its last adjusted position, said last-mentioned moving means being equally effective regardless of whether said last adjusted position of the supporting means was established by said first adjusting means or said first position changing means.

3. In X-ray analysis apparatus, a source of X-rays, a base plate, means for mounting the source of X-rays on said base plate, a second base plate, means for mounting said second base plate on said first base plate, a goniometer comprising a slit assembly, an ionization chamber, means for supporting a specimen being analyzed in the path of X-rays from said source, said specimen supporting means being adjustable with respect to the path of X-rays, and lever-controlled means for moving said specimen supporting means a predetermined, relatively short distance in each of two opposite directions from the adjusted position thereof and means for supporting all of the elements of said goniometer from said second base plate.

4. In X-ray analysis apparatus, a source of X-rays, a base plate, means for supporting the source of X-rays on said base plate, a second base plate mounted on said first base plate, clamping means for securing said second base plate in position on said first base plate, said clamping means being releasable whereby on occasion the position of said second base plate on said first plate may be changed, a goniometer comprising a slit assembly, an ionization chamber, means for supporting a specimen being analyzed in the path of X-rays from said source, said specimen supporting means being adjustable with respect to the path of X-rays, and lever-controlled means for moving said specimen supporting means a predetermined, relatively short distance in each of two opposite directions from the adjusted position thereof and means for supporting all of the elements of the goniometer from said second base plate.

5. In apparatus for analysis of a crystal by X-rays, a source of X-rays, a goniometer comprising a slit assembly, an ionization chamber and a carriage for supporting a crystal in the path of X-rays from said source, a base, a vertical member mounted on said base, an arm for supporting said ionization chamber, means for so mounting said arm that it is supported by said base and rotatable about said vertical member, means for fixedly supporting the slit assembly from said vertical member, means for adjustably supporting said carriage from said vertical member whereby the position of said carriage with respect to said slit assembly may be adjusted and additional means for causing movement of predetermined fixed magnitude of said carriage in each of two opposition directions from the adjusted position thereof.

6. In apparatus for analysis of a crystal by X-rays, a source of X-rays, a goniometer comprising a slit assembly, an ionization chamber and a carriage for supporting a crystal in the path of X-rays from said source, a base, a vertical member mounted on said base, an arm for supporting said ionization chamber, means for so mounting said arm that it is supported by said base and rotatable about said vertical member, a first plate fixedly supported by said vertical member, means for supporting said slit assembly from said first plate, a member rotatably mounted on said vertical member, said rotatably mounted member comprising a second plate adjacent said first plate, a third plate removed therefrom and a cylindrical member coupling said second and said third plates, means for rotatably mounting said carriage on said vertical member, means for mechanically coupling said carriage and said third plate whereby rotation of said third plate normally results in corresponding rotation of said carriage, means for adjusting the rotational position of said second plate with respect to said first plate whereby the position of said carriage with respect to said slit assembly is likewise adjusted, and additional means for rotating said carriage a predetermined distance in each of two opposite directions from its normal position with respect to said third plate.

7. In apparatus for analysis of a crystal by X-rays, a source of X-rays, a goniometer comprising a slit assembly, an ionization chamber and a carriage for supporting a crystal in the path of X-rays from said source, a base, a vertical member mounted on said base, an arm for supporting said ionization chamber, means for so mounting said arm that it is supported by said base and rotatable about said vertical member, a first plate fixedly supported by said vertical member, means for supporting said slit assembly from said first plate, a member rotatably mounted on said vertical member, said rotatably mounted member comprising a second plate adjacent said first plate, a third plate removed therefrom and a cylindrical member coupling said second and said third plates, means for rotatably mounting said carriage on said vertical member, means for mechanically coupling said carriage and said third plate whereby rotation of said third plate normally results in corresponding rotation of said carriage, means for adjusting the rotational position of said second plate with respect to said first plate whereby the position of said carriage with respect to said slit assembly is likewise adjusted, means for further adjusting the position of said carriage with respect to said slit assembly by moving said carriage a predetermined distance in either of two opposite directions, and means independent of said previously mentioned adjusting means for rotating said carriage a predetermined distance in each of two opposite directions from its normal position with respect to said third plate.

8. In apparatus for analysis of a crystal by X-rays, a source of X-rays, a goniometer comprising a slit assembly, an ionization chamber and a carriage for supporting a crystal in the path of X-rays from said source, a base, a vertical member mounted on said base, an arm for supporting said ionization chamber, means for so mounting said arm that it is supported by said base and rotatable about said vertical member, a first plate fixedly supported by said vertical member, means for supporting said slit assembly from said first plate, a member rotatably mounted on said vertical member, said rotatably mounted member comprising a second plate adjacent said first plate, a third plate removed therefrom and a cylindrical member coupling said second and said third plates, a fourth plate rotatably mounted on said vertical member, said fourth plate having a U-shaped cut-away portion therein, means for rotatably mounting said carriage on said vertical member, means for mechanically coupling said carriage and said fourth plate, a pin terminating in an offset portion rotatably mounted in said third plate, a cam block carried by the offset portion of said pin, said cam block being positioned in the U-shaped cut-away portion of said fourth plate with surfaces of the cam block engaging the defining side walls of the cut-away portion, engagement of the cam block and the side walls of the cut-away portion being effective when said pin is stationary in said third plate to mechanically couple said fourth plate to said third plate and being effective when said pin is rotated in said third plate to cause rotation of said fourth plate from its normal position with respect to said third plate, means for adjusting the rotational position of said third plate while said pin is stationary therein whereby said fourth plate and said carriage are correspondingly adjusted, and means for rotating said pin a predetermined distance in said third plate whereby said fourth plate and said carriage are rotated a predetermined distance from their normal position with respect to said third plate.

9. In apparatus for analysis of a crystal by X-rays, a source of X-rays, a goniometer comprising a slit assembly, an ionization chamber and a carriage for supporting a crystal in the path of X-rays from said source, a base, a vertical member mounted on said base, an arm for supporting said ionization chamber, means for so mounting said arm that it is supported by said base and rotatable about said vertical member, a first plate fixedly supported by said vertical member, means for supporting said slit assembly from said first plate, a member rotatably mounted on said vertical member, said rotatably mounted member comprising a second plate adjacent said first plate, a third plate removed therefrom and a cylindrical member coupling said second and said third plates, a fourth plate rotatably mounted on said vertical member, means for rotatably mounting said carriage on said vertical member, a bar rotatably mounted on said carriage, said bar having a plurality of peripheral slots therein, the slots being joined to form a complete indented path around said bar, adjacent slots being misaligned with respect to their center lines whereby the path comprises a plurality of misaligned sections, a pin positioned in said fourth plate with the tip thereof projecting from an edge of said fourth plate, the tip of said pin being positioned in one of the slots in said bar, engagement of the tip of said pin in one of the slots being effective when said bar is stationary in said carriage to mechanically couple said carriage to said fourth plate and being effective when said bar is rotated to cause rotation of said carriage a predetermined distance from its normal position with respect to said fourth plate, means for adjusting the rotational position of said fourth plate while said bar is stationary in said carriage whereby the position of said carriage is correspondingly adjusted, means for rotating said bar a predetermined distance whereby said carriage is rotated a predetermined distance from its normal position with respect to said fourth plate, and additional means for rotating said carriage a predetermined distance in either of two opposite directions from its position as determined by the operation of the previously mentioned adjusting means.

WALTER L. BOND.